United States Patent
Van Oirschot et al.

(10) Patent No.: US 6,913,683 B2
(45) Date of Patent: Jul. 5, 2005

(54) METHOD AND DEVICE FOR THE PRODUCTION OF PIPE SEGMENTS FROM A HOLLOW PIPE

(75) Inventors: Cornelus Hendricus Maria Van Oirschot, Tilburg (NL); Roland Theo Anton Kals, Oisterwijk (NL); Hendrikus Van Den Boomen, Tilburg (NL)

(73) Assignee: Van Doorne's Transmissie B.V., AM Tilburg (NL)

( * ) Notice: Subject to any disclaimer, the term of this patent is extended or adjusted under 35 U.S.C. 154(b) by 205 days.

(21) Appl. No.: 10/204,302

(22) PCT Filed: Feb. 13, 2001

(86) PCT No.: PCT/NL01/00120

§ 371 (c)(1),
(2), (4) Date: Nov. 25, 2002

(87) PCT Pub. No.: WO01/60558

PCT Pub. Date: Aug. 23, 2001

(65) Prior Publication Data

US 2003/0146107 A1 Aug. 7, 2003

(30) Foreign Application Priority Data

Feb. 21, 2000 (NL) .............................................. 1014450

(51) Int. Cl.[7] .............................. B23H 3/00; B23H 3/10; C25D 17/00

(52) U.S. Cl. ....................... 205/652; 205/672; 205/686; 204/212; 204/289; 204/272; 204/224 R; 204/224 M

(58) Field of Search ................................ 205/654, 672, 205/686, 663, 670, 671, 652; 204/224 M, 224 R

(56) References Cited

U.S. PATENT DOCUMENTS

| | | | |
|---|---|---|---|
| 2,741,594 A | * | 4/1956 | Bowersett ................... 204/212 |
| 3,616,347 A | | 10/1971 | Haggerty |
| 4,988,425 A | | 1/1991 | Everhart |
| 5,317,607 A | | 5/1994 | Formanek |

FOREIGN PATENT DOCUMENTS

| | | | |
|---|---|---|---|
| GB | 1338221 | * | 11/1973 |
| GB | 2174945 | * | 11/1986 |

* cited by examiner

Primary Examiner—Donald R. Valentine
(74) Attorney, Agent, or Firm—Young & Thompson

(57) ABSTRACT

A method for the production of pipe segments from a pipe (10) in which the pipe (10) is rotated about its longitudinal axis, while an electrode (20) is positioned in the vicinity of the outer surface (11) of the pipe (10) and electrolyte (30) is fed to the space between the pipe (10) and the electrode (20). The electrode (20) and the pipe (10) are connected to a voltage source (40), with the result that an electric current is brought about via the electrolyte (30). Thus, the pipe (10) is divided into pipe segments in an electrochemical way.

6 Claims, 3 Drawing Sheets

METHOD AND DEVICE FOR THE PRODUCTION OF PIPE SEGMENTS FROM A HOLLOW PIPE

The present invention relates to a method for the production of annular pipe segments from a circular cylindrical hollow pipe.

Such methods are known in practice. A pipe may, for example, be divided into at least two segments by sawing. However, the industrial use of such a method has a number of drawbacks, including wear to the saw and the associated need for the saw to be regularly replaced. Another drawback of sawing is that burrs are formed on the sawn or cut surfaces. This is undesirable with a view to possible further processing or further use of the pipe segments. The use of a method such as sawing also has the drawback that scratches are formed on the cut surfaces which, during further processing of the pipe segments, such as stretching, or during specific use of a pipe segment, constitute initiations to cracks.

It is an object of the present invention to provide a novel and alternative method for the production of pipe segments from a pipe which eliminates the said drawbacks.

This object is achieved by the fact that the production of pipe segments from a pipe is realized by positioning an electrode in the vicinity of the outer surface of the pipe; rotating the pipe about its longitudinal axis; feeding electrolyte to the space between the pipe and the electrode; and bringing about an electric current between the pipe and the electrode, via the electrolyte.

Thus, the pipe is divided into pipe segments in an electrochemical way. In the method, the pipe is rotated about its longitudinal axis while an electrode is placed in the vicinity of the outer surface of the pipe and an electrolyte is fed to the space between the pipe and the electrode. The electrode and the pipe are connected to a voltage source, the pipe being positive with respect to the electrode. Under the influence of the current which is in this way brought about between the electrode and the pipe, via the electrolyte, pipe material dissolves in the electrolyte. Since the pipe is rotating, pipe material dissolves from the section of the pipe which is under the influence of the electrode, in the radial direction over the entire circumference of the pipe. As a result, a groove is formed in the pipe. This process can be continued until the pipe has been divided into separate pipe segments.

The use of the method according to the invention has the advantage that high-quality pipe segments are obtained, the cut surfaces of which are smooth and do not require any further machining.

The invention also relates to a device for using the method, to a pipe segment produced from a pipe by means of the method and to an end product produced from such a pipe segment.

It is noted that a method in which a planar workpiece is machined by bringing about an electric current between the workpiece and an electrode via an electrolyte is known per se. In such a method, the workpiece is situated in a bath of electrolyte, the surface of the workpiece being machined by means of the electrode. In this method which is known per se, there is no movement of the workpiece with respect to the electrode. Furthermore, this method which is known per se is only suitable for treating the surfaces of planar workpieces and is not used for producing annular segments from a circular cylindrical workpiece.

The method according to the invention and a preferred embodiment of a device for using this method will be explained in more detail in the following description with reference to the appended drawing, in which.

In the figures, identical or similar components will be denoted by identical reference numerals.

Figure 1:
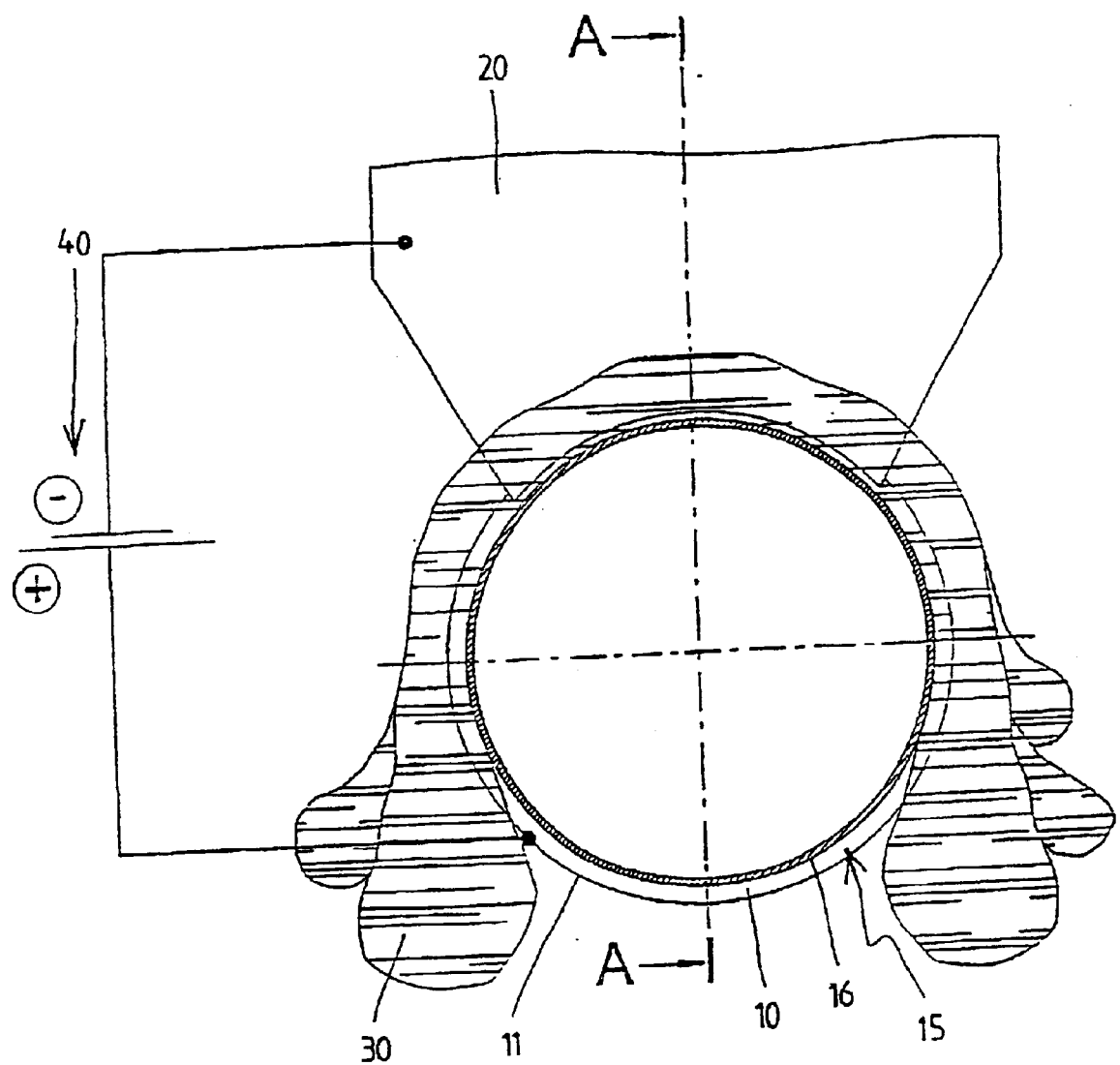
FIG. 1 shows a diagrammatic cross section of components of a device for using the method according to the invention.
Figure 2:
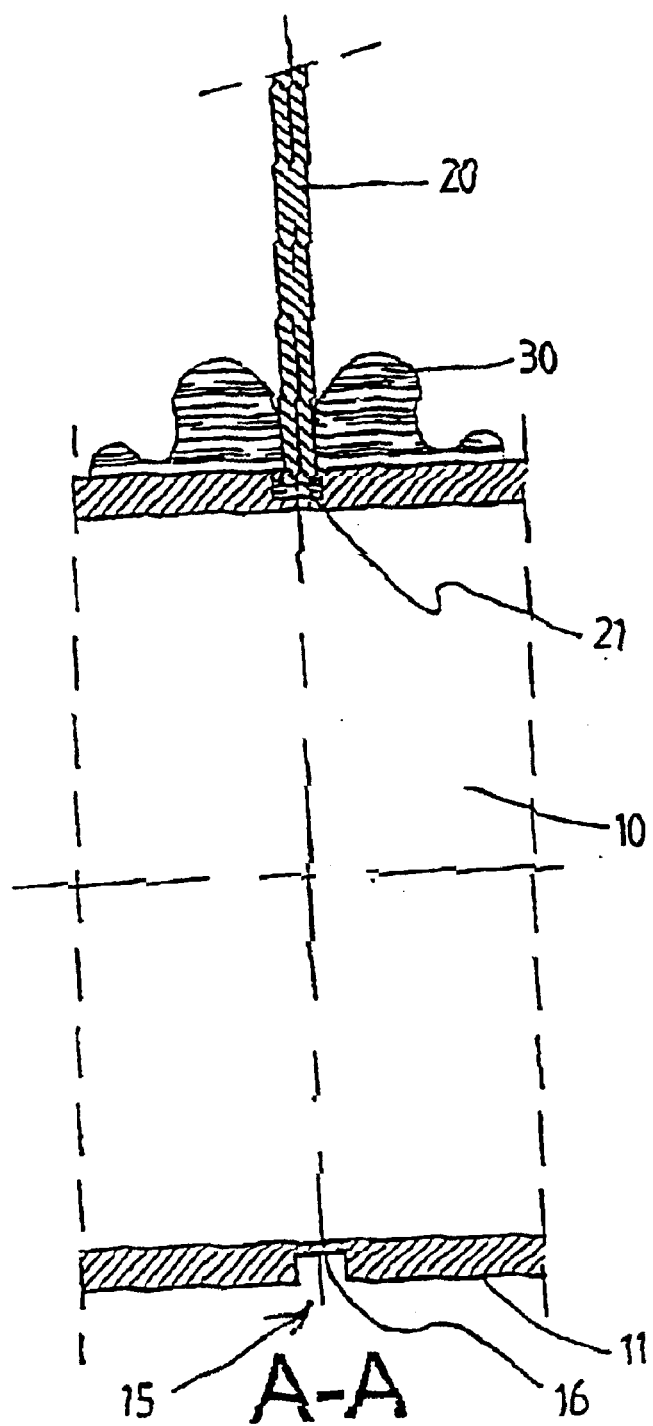
FIG. 2 shows a diagrammatic longitudinal section of a number of the components shown in FIG. 1.

FIGS. 1 and 2 diagrammatically show components of a device for using the method according to the invention.

The device comprises an electrode 20 with an end 21. The electrode 20 is positioned in the vicinity of the outer surface 11 of a hollow and circular cylindrical pipe 10 which is to be machined. By way of example, the pipe 10 is a metal pipe with an external diameter which lies between 96 and 106 mm, and the difference between the outer diameter and the inner diameter is less than 4 mm. The pipe 10 is rotated during the machining process. An electrolyte 30 is fed to the space between the pipe 10 and the electrode 20 by means of feed means (not shown). Using a voltage source 40, an electric current is generated between the pipe 10 and the electrode 20, via the electrolyte 30. In this case, the pipe 10 is positive with respect to the electrode 20, and material of the pipe 10 dissolves in the electrolyte 30. Since the pipe 10 is rotating in the process, a groove 15 with a groove base 16 is formed over the circumference of the pipe 10.

The dissolution of pipe material in the radial direction can continue until the depth of the groove 15 is such that the pipe 10 has been divided into two separate pipe segments.

If the pipe 10 is always positive with respect to the electrode 20, the method is referred to as being "monopolar". The process may also be carried out in "bipolar" form, in which case the pipe 10 is alternately positive and negative with respect to the electrode 20 and the pipe 10 is then on average predominantly positive with respect to the electrode 20.

Advantageously, a radial movement in the direction of the centre axis of the pipe 10 is imparted to the electrode 20 during the machining process. More advantageously, the electrode 20 is moved in the radial direction in such a manner that the radial distance between the end 21 of the electrode 20 and the groove base 16 remains substantially constant. Obviously, it is also possible to move the pipe 10 in the radial direction, but a radial movement of the electrode 20 is preferred according to the invention.

For the processing of the pipe 10 to proceed correctly, a vibratory motion may be imparted to the electrode 20 in the radial direction, even if the electrode 20 is moving continuously in the radial direction.

The pipe 10 is preferably clamped on a rotatable pipe holder (not shown), the pipe holder being arranged in the interior of the pipe 10. The rotation of the pipe 10 about its longitudinal axis then takes place by rotation of the pipe holder.

The current conduction may take place, for example, via the pipe holder. Another option is to use a sliding or rolling contact on the outer surface 11 of the pipe 10 for the current conduction.

Preferably, electrical contact with each pipe segment is separate, so that the division of the pipe 10 into separate pipe segments can take place in an even and substantially uniform way. The separate pipe segments obtained are then similar to one another, in particular in terms of their cut surfaces. Advantageously, the electrical contact is maintained for a certain time even after the division of the pipe into separate pipe segments.

The said pipe holder is advantageously formed as a segmented mandrel, the dimensions in the radial direction of the mandrel parts being variable for each mandrel part. By way of example, it is possible to use a mandrel with retractable mandrel parts which is known per se. In a preferred embodiment of the mandrel, the mandrel parts are situated on either side of the electrode 20 in the axial direction. When the pipe 10 is then divided into separate pipe segments, contact between the electrode 20 and the mandrel is avoided. Moreover, the separate pipe segments are then on separate mandrel parts, so that, for example, the removal of the pipe segments can be carried out in a controlled manner.

The end 21 of the electrode 20 which faces towards the circular cylindrical pipe 10 is preferably in the form of a segment of a circle, the radius of which is adapted to the radius of the pipe 10. One example of this is shown in FIG. 1. In principle, the tangential dimension of the segment of a circle can be selected as desired.

It is possible to use a plurality of electrodes 20 in the tangential direction, in which case the electrodes 20 are distributed in the tangential direction over the circumference of the pipe 10. In this case, the electrodes 20 may be individually displaceable in the radial direction. Another possible option is the use of a divided electrode, in which a plurality of ends 21 are distributed in the tangential direction over the circumference of the pipe 10.

The electrode 20 is advantageously in plate form, the electrode 20 adopting a substantially perpendicular position with respect to the longitudinal axis of the pipe 10, as shown in FIG. 2. With a view to limiting on the one hand the loss of pipe material and on the other hand the energy consumption, a thinner electrode 20 is preferred to a thicker electrode 20.

To ensure that the current only passes between the end 21 of the electrode 20 and the pipe 10, the other surfaces of the electrode 20 can be insulated.

The rotational speed of the pipe 10 is at least 1 rpm and, depending, for example, on the dimensions of the workpiece and the desired cutting quality, may vary up to more than 400 rpm. The value of the rotational speed is preferably in the range from 20 to 400 rpm, with a value of the order of approximately 100 rpm being preferred.

The feed of the electrolyte 30 to the space between the pipe 10 and the electrode 20 advantageously takes place by means of a forced flow of electrolyte, which can be produced, for example, by applying a pressure difference. With the help of such a forced flow, it is easy to discharge pipe material.

The feed means for the electrolyte 30 preferably comprise a nozzle (not shown) which is arranged in the vicinity of the space between the pipe 10 and the electrode 20.

In another advantageous embodiment, the feed means for the electrolyte 30 comprise a feed passage (not shown) in the electrode 20, which opens out in an outlet opening in the end 21 of the electrode 20 which faces towards the pipe 10. Using such feed means, the electrolyte 30 is introduced directly into the space between the pipe 10 and the electrode 20. The electrode 20 is in this case of at least partially hollow design.

Used electrolyte 30 is preferably collected and then returned to the feed means.

Figure 3:
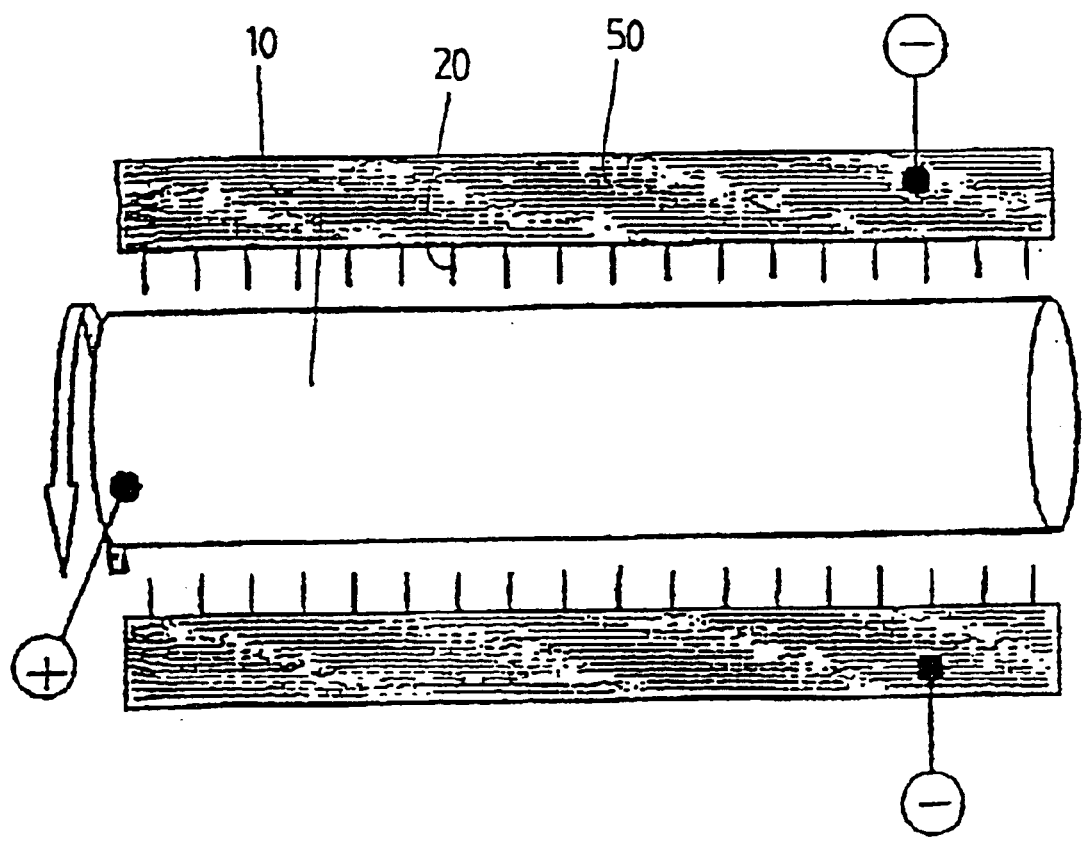
FIG. 3 shows a diagrammatic side view of a preferred embodiment of a device for using the method according to the invention.

FIG. 3 diagrammatically shows a side view of a preferred embodiment of a device for using the method according to the invention.

The device comprises several electrodes 20 which are arranged next to one another in the longitudinal direction of the pipe 10. Using the said device, the pipe 10 can be machined at several locations simultaneously, with the result that several pipe segments can be obtained simultaneously. The pipe 10 is rotated and is predominantly positive with respect to the electrodes 20. The electrodes 20 could be mounted and moved individually, but in the embodiment shown the electrodes 20 are situated on a common electrode mount 50, so that a movement of the electrode mount 50 leads to a joint movement of the electrodes 20. By way of example, two electrode mounts 50 with electrodes 20 are illustrated in FIG. 3. Electrolyte is fed to all the individual spaces between the pipe 10 and the electrodes 20, and an electric current is brought about between the pipe 10 and each electrode 20, via the electrolyte.

It will be obvious to the person skilled in the art that the scope of the present invention is not restricted to the example which has been discussed above, but rather various amendments and modifications thereto are possible without departing from the scope of the invention as defined in the appended claims.

What is claimed is:

1. Method for the production of annular pipe segments from a circular cylindrical hollow pipe (10), comprising:
    positioning an electrode (20) in the vicinity of the outer surface (11) of the pipe (10);
    rotating the pipe (10) about its longitudinal axis;
    feeding electrolyte (30) to the space between the pipe (10) and the electrode (20);
    bringing about an electric current between the pipe (10) and the electrode (20), via the electrolyte (30);
    and imparting a vibratory motion to the electrode (20) in the radial direction.

2. Device for the production of annular pipe segments from a circular cylindrical hollow pipe (10), comprising:
    at least one electrode (20);
    means for positioning and rotating the pipe (10) with respect to the electrode (20);
    feed means for feeding electrolyte (30) to a space between the pipe (10) and the electrode (20); and
    means (40) for generating an electric current between the pipe (10) and the electrode (20), via the electrolyte (30);
    wherein the end (21) of the electrode (20) which faces towards the pipe (10) is in the form of a segment of a circle.

3. Method for the production of annular pipe segments from a circular cylindrical hollow pipe (10), comprising:
    positioning an electrode (20) in the vicinity of the outer surface (11) of the pipe (10);
    rotating the pipe (10) about its longitudinal axis;
    feeding electrolyte (30) to the space between the pipe (10) and the electrode (20);
    and bringing about an electric current between the pipe (10) and the electrode (20), via the electrolyte (30);
    wherein the rotational speed of the pipe (10) is at least 1 rpm, and the value of the rotational speed is preferably in the range from 20 to 400 rpm.

4. Method for the production of annular pipe segments from a circular cylindrical hollow pipe (10), comprising:
    positioning an electrode (20) in the vicinity of the outer surface (11) of the pipe (10);
    rotating the pipe (10) about its longitudinal axis;

feeding electrolyte (30) to the space between the pipe (10) and the electrode (20);

bringing about an electric current between the pipe (10) and the electrode (20), via the electrolyte (30);

and clamping the pipe (10) onto a central pipe holder in the interior of the pipe (10), the rotation taking place via the pipe holder, and the current conduction also taking place via the pipe holder.

5. Device for the production of annular pipe segments from a circular cylindrical hollow pipe (10), comprising:

at least one electrode (20);

means for positioning and rotating the pipe (10) with respect to the electrode (20);

feed means for feeding electrolyte (30) to a space between the pipe (10) and the electrode (20); and and means (40) for generating an electric current between the pipe (10) and the electrode (20), via the electrolyte (30);

wherein several electrodes (20) are arranged next to one another in the longitudinal direction of the pipe (10).

6. Device for the production of annular pipe segments from a circular cylindrical hollow pipe (10), comprising:

at least one electrode (20);

means for positioning and rotating the pipe (10) with respect to the electrode (20);

feed means for feeding electrolyte (30) to a space between the pipe (10) and the electrode (20); and means (40) for generating an electric current between the pipe (10) and the electrode (20), via the electrolyte (30);

wherein the positioning means comprise a segmented mandrel, the dimensions in the radial direction of the mandrel parts being variable for each mandrel part, and the mandrel being electrically conductive.

* * * * *